UNITED STATES PATENT OFFICE.

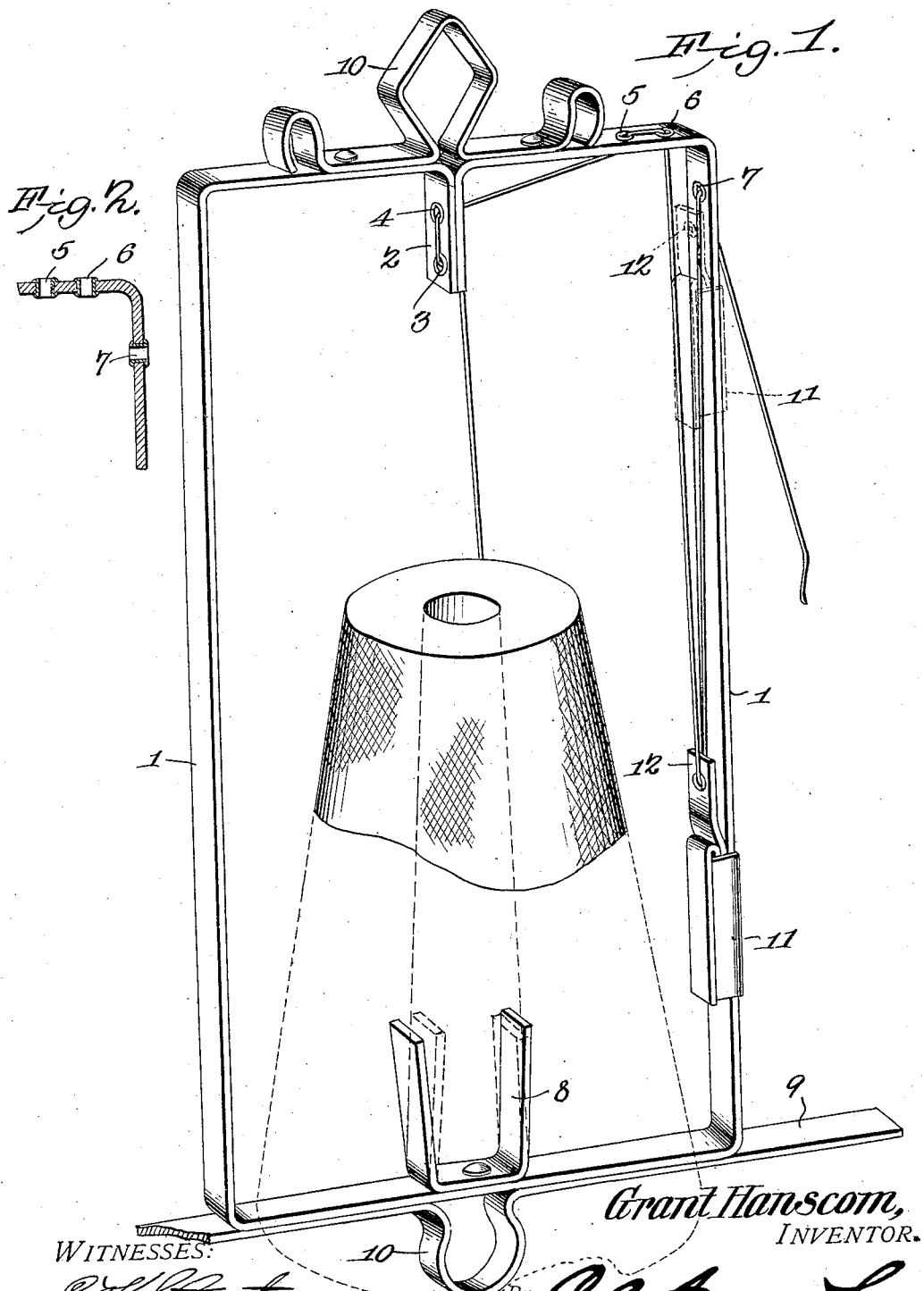

GRANT HANSCOM, OF LOVELAND, COLORADO.

TWINE-HOLDER.

No. 848,648.

Specification of Letters Patent.

Patented April 2, 1907.

Application filed April 20, 1906. Serial No. 312,821.

*To all whom it may concern:*

Be it known that I, GRANT HANSCOM, a citizen of the United States, residing at Loveland, in the county of Larimer and State of Colorado, have invented a new and useful Twine-Holder, of which the following is a specification.

This invention relates to twine-holders; and its object is to provide a simple and inexpensive device of this character adapted to hold a quantity of twine which can be removed in desired lengths, said holder being so disposed as to prevent twine from unwinding too rapidly and also provided with means for taking up the slack in the twine.

The invention consists of a frame having means on the bottom thereof for engaging a cone of twine, and disposed within the upper portion of the frame are novel arrangements of eyes through which cord is adapted to be threaded. The cord is also threaded through a weight which is slidably mounted on the frame and serves to automatically take up slack.

The invention also consists of certain other novel features of construction and combinations of parts, which will be hereinafter more fully described, and pointed out in the claims.

In the accompanying drawings is shown the preferred form of the invention.

In said drawings, Figure 1 is a perspective view of the holder and showing by dotted and full lines a cone of twine in position therein, and Fig. 2 is a vertical section through one corner of the frame of the holder.

Referring to the figures by characters of reference, 1 is a preferably rectangular frame formed by a strip of metal the ends of which are bent inward and brought together at the center of the top of the frame to form a central depending tongue 2, having openings 3 and 4 arranged therein one above the other. A pair of openings 5 and 6 are also formed in the top of the frame at one side of the tongue, and another opening 7 is formed in one side of the frame adjacent openings 5 and 6. A U-shaped bracket 8 is riveted or otherwise secured upon the center of the bottom of the frame and has upwardly-extending fingers adapted to project into and contact with a cone of twine, so as to hold it against displacement. These fingers are preferably formed of spring metal, so as to exert a constant pressure radially against the inner wall of the twine cone. Arms 9 extend beyond the sides of the frame at the bottom thereof, and suitable scrollwork 10 is arranged upon the top and bottom portions of the frame, and this is adapted to be utilized in suspending the holder from any suitable support. Each of the openings 3, 4, 5, 6, and 7 is lined with an eyelet, so as to reduce to the minimum the wear upon twine adapted to be inserted therethrough. A slide 11 is mounted on the apertured side of the frame and has an apertured tongue 12 projecting upward from it, the aperture of said tongue being also lined with an eyelet. This slide is weighted in any preferred manner.

In using the device a cone of twine is placed upon the bracket 8, and the end of the twine is then threaded first through the opening 3 and then through the opening 4 and then upward through opening 5 and downward through opening 6. The twine is then inserted through the apertured tongue 12 and upward through opening 7. The end of the twine is then allowed to hang free outside of the frame. When it is desired to use a portion of the twine, the end thereof is pulled and will cause the slide 11 to travel upward on the side of the frame. If a sufficient quantity of twine is not measured off when this movement of the slide is completed, an additional quantity will be unwound from the cone and slipped through the openings 3, 4, 5, and 6, thence directly through the tongue 12 and opening 7. As soon as the twine has been released the slide 11 will move back to its normal position and will take up the slack in the twine and retract a part of the end portion through the opening 7 and into the frame.

The entire device is very simple in construction, attractive, and efficient. The arms 9 prevent the twine from becoming entangled around the corners of the frame, and the apertures 3, 4, 5, and 6 are so disposed in relation to one another as to sufficiently retard the movement of the twine without, however, subjecting it to undue friction.

What is claimed is—

A twine-holder comprising a frame having inwardly-turned ends constituting a centrally-disposed depending tongue at the top thereof, said tongue having apertures therein disposed along the longitudinal center of the frame and extending at right angles to the longitudinal axis of the frame, said frame having a pair of apertures within and extending at right angles to the top thereof and being disposed adjacent one corner of the frame, there being another aperture in one side of the frame adjacent said corner, all of said apertures being located in the same plane, a cone-engaging bracket upon the bottom of the frame and in alinement with the tongue, a slide mounted on the apertured side of the frame, and an apertured tongue extending from said slide, the apertures in the frame-tongue, top, slide-tongue, and side being adapted to receive twine from a cone upon the bracket, the walls of the apertures in the frame being adapted to frictionally engage said twine with sufficient force to hold it against movement during the action of the slide, and laterally-extending arms secured to the bottom of the frame and constituting guards for the twine end.

In testimony that I claim the foregoing as my own I have hereto affixed my signature in the presence of two witnesses.

GRANT HANSCOM.

Witnesses:
 CARLTON E. CLARK,
 CHAS. ESSIG.